US012702884B2

(12) United States Patent
Kjellman

(10) Patent No.: US 12,702,884 B2
(45) Date of Patent: Aug. 11, 2026

(54) FIRE DETECTION CONSOLIDATOR

(71) Applicant: KIDDE-FENWAL, LLC, Ashland, MA (US)

(72) Inventor: Thomas Kjellman, Uxbridge, MA (US)

(73) Assignee: Kidde Fenwal, LLC, Ashland, MA (US)

( * ) Notice: Subject to any disclaimer, the term of this patent is extended or adjusted under 35 U.S.C. 154(b) by 487 days.

(21) Appl. No.: 18/175,673

(22) Filed: Feb. 28, 2023

(65) Prior Publication Data

US 2023/0293925 A1 Sep. 21, 2023

Related U.S. Application Data

(60) Provisional application No. 63/320,845, filed on Mar. 17, 2022.

(51) Int. Cl.

| | |
|---|---|
| ***A62C 37/48*** | (2006.01) |
| ***A62C 3/00*** | (2006.01) |
| ***A62C 37/42*** | (2006.01) |
| ***A62C 99/00*** | (2010.01) |

(52) U.S. Cl.

CPC .............. *A62C 37/48* (2013.01); *A62C 37/42* (2013.01); *A62C 99/009* (2013.01); *A62C 3/006* (2013.01)

(58) Field of Classification Search

CPC ....... A62C 37/48; A62C 37/42; A62C 99/009; A62C 3/006; A62C 37/04; A62C 37/36; G08B 17/00

USPC ........................................ 169/59, 65; 137/72

See application file for complete search history.

(56) References Cited

U.S. PATENT DOCUMENTS

| | | | | |
|---|---|---|---|---|
| 3,378,081 A * | 4/1968 | O'Reilly | A62C 37/42 | 169/17 |
| 4,889,313 A * | 12/1989 | Sanchez | F16K 31/465 | 251/74 |
| 4,979,572 A * | 12/1990 | Mikulec | A62C 3/006 | 239/524 |
| 5,297,636 A * | 3/1994 | North | A62C 3/006 | 169/65 |
| 6,286,604 B1 | 9/2001 | Ou | | |
| 8,746,358 B2 | 6/2014 | Alchalel et al. | | |
| 2010/0101809 A1* | 4/2010 | Christensen | A62C 3/006 | 169/65 |
| 2011/0214888 A1* | 9/2011 | Alchalel | A62C 37/36 | 169/46 |
| 2014/0096980 A1* | 4/2014 | Dzegan | A62C 35/68 | 169/16 |
| 2015/0231432 A1* | 8/2015 | Zlatintsis | A62C 37/46 | 169/61 |
| 2020/0338376 A1 | 10/2020 | Kjellman | | |

OTHER PUBLICATIONS

Extended European Search Report for European Application No. 23162166.5; Report Mail Date Jul. 26, 2023 (7 Pages).

* cited by examiner

*Primary Examiner* — Kevin Edward Schwartz

(74) *Attorney, Agent, or Firm* — Honigman LLP; Andrew J. Boes

(57) ABSTRACT

An actuation mechanism of a fire suppression system includes a first input having a first tension, a second input having a second tension, and an output. When the actuation mechanism is in an inactive configuration, the first input and the second input cooperate to maintain a third tension in the output.

12 Claims, 9 Drawing Sheets

FIRE DETECTION CONSOLIDATOR

CROSS-REFERENCE TO RELATED APPLICATIONS

This application claims the benefit of U.S. Application No. 63/320,845, filed Mar. 17, 2022, the contents of which are incorporated by reference herein in their entirety.

BACKGROUND

Embodiments of the present disclosure relate to a system and method for delivering a fire suppression agent to a cooking appliance in the event of a fire, and more particularly to an actuation mechanism operable to initiate delivery of a fire suppression agent through an agent delivery path.

Fire suppression systems typically include a plurality of detection lines such as link cables. It is sometimes desired for multiple detection lines associated with either the same region or different regions of the fire suppression system to be capable of initiating a central bank of canisters to release fire suppression agent. This control is typically provided by including duplicate input mechanisms to allow for a plurality of input lines. However, adapting the control box of the fire suppression system for use with multiple inputs increases the costs for all users, regardless of whether a system having multiple inputs is utilized.

BRIEF DESCRIPTION

According to an embodiment, an actuation mechanism of a fire suppression system includes a first input having a first tension, a second input having a second tension, and an output. When the actuation mechanism is in an inactive configuration, the first input and the second input cooperate to maintain a third tension in the output.

In addition to one or more of the features described herein, or as an alternative, in further embodiments the first tension and the second tension are applied in a first direction and the third tension is applied in a second, opposite direction.

In addition to one or more of the features described herein, or as an alternative, in further embodiments the first tension and the second tension are applied in a first direction and the third tension is applied in the same first direction.

In addition to one or more of the features described herein, or as an alternative, in further embodiments both the first tension and the second tension are acting in a first direction.

In addition to one or more of the features described herein, or as an alternative, in further embodiments the first input further comprises a first support and a first tension member and the second input further comprises a second support and a second tension member.

In addition to one or more of the features described herein, or as an alternative, in further embodiments the first support and the second support are pivotally mounted.

In addition to one or more of the features described herein, or as an alternative, in further embodiments a first rotational axis of the first support is parallel to and coplanar with a second rotational axis of the second support.

In addition to one or more of the features described herein, or as an alternative, in further embodiments the output further comprises an output tension member and a retaining member connected to the output tension member.

In addition to one or more of the features described herein, or as an alternative, in further embodiments when the actuation mechanism is in the inactive configuration, the retaining member is arranged in contact with a portion of the first support and the second support.

In addition to one or more of the features described herein, or as an alternative, in further embodiments in the inactive configuration, a clearance is formed between the first support and the second support, wherein the clearance is smaller than the retaining member.

In addition to one or more of the features described herein, or as an alternative, in further embodiments each of the first support and the second support has an active end and when the actuation mechanism is in the inactive configuration, the retaining member is operably coupled to the active end of at least one of the first support and the second support.

In addition to one or more of the features described herein, or as an alternative, in further embodiments a surface of the active end of at least one of the first support and the second support is complementary to a corresponding surface of the retaining member.

In addition to one or more of the features described herein, or as an alternative, in further embodiments the fire suppression system further comprises a plurality of spray nozzles and the first input is associated with a first region of the plurality of spray nozzles and the second input is associated with a second region of the plurality of spray nozzles.

In addition to one or more of the features described herein, or as an alternative, in further embodiments the fire suppression system further comprises a plurality of spray nozzles and the first input is associated with a first region of the plurality of spray nozzles and the second input is associated with the first region of the plurality of spray nozzles.

In addition to one or more of the features described herein, or as an alternative, in further embodiments the fire suppression system further comprises a sensor and a manual activation system, wherein the first input is operably coupled to the sensor and the second input is operably coupled to the manual activation system.

In addition to one or more of the features described herein, or as an alternative, in further embodiments the actuation mechanism includes a plurality of stages including a first stage and a second stage, the first input, the second input, and the output being arranged within the first stage, wherein the output is operably to an input of the second stage.

Also disclosed is a method of operating an actuation mechanism of a fire suppression system includes providing a first input, a second input, and an output. The first input and the second input cooperate to restrict movement of the output. The method further including removing tension from the first input and removing tension from the output.

In addition to one or more of the features described herein, or as an alternative, in further embodiments comprising moving the first input out of a path of movement of the output in response to removing tension from the first input.

In addition to one or more of the features described herein, or as an alternative, in further embodiments the first input further comprises a first tension member and a first support and moving the first input out of the path of movement of the output further comprises rotating the first support about an axis.

In addition to one or more of the features described herein, or as an alternative, in further embodiments the first input is associated with a first region of the fire suppression system and the second input is associated with a second region of the fire suppression system. The method further includes activating a canister associated with the first region of the fire suppression system in response to removing tension from the output.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
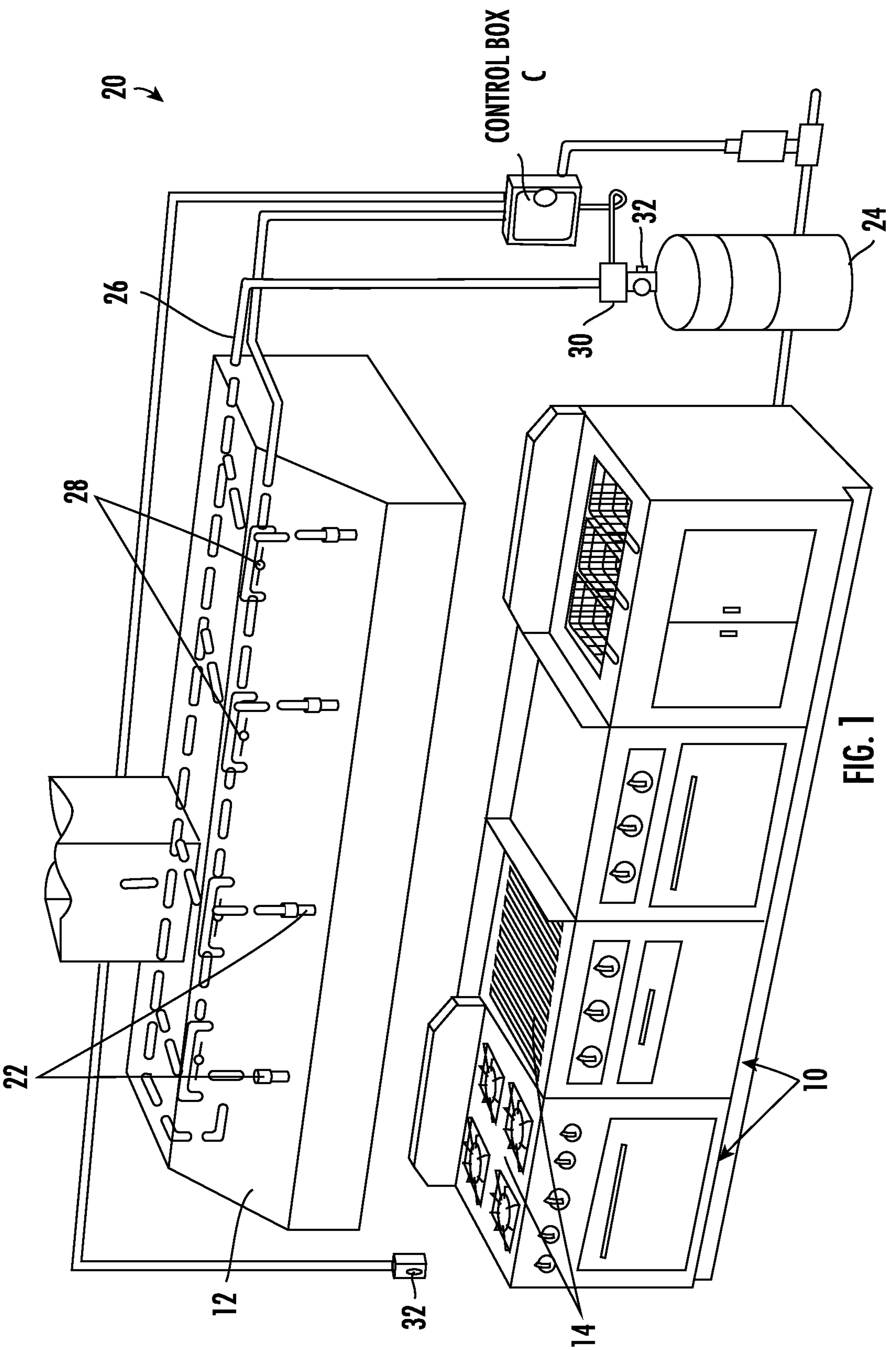
FIG. 1 is a schematic diagram of an exemplary system for delivering a fire suppression agent to at least one cooking appliance according to an embodiment.

With reference now to FIG. 1, an example of a system 20 for delivering a fire suppression agent to one or more cooking appliances 10 is illustrated. The fire suppression system 20 may be located separate or remotely from the cooking appliance 10, such as within a vent hood 12, or alternatively, may be integrated or housed at least partially within a portion of the cooking appliance 10. It should be understood that the configuration of the fire suppression system 20 may vary based on the overall structural design of the cooking appliance 10. The fire suppression system 20 includes one or more spray nozzles 22 associated with the cooking appliance 10 and a source of fire suppression agent 24 in the form of at least one self-contained pressurized canister. In embodiments including a plurality of cooking appliances 10, one or more spray nozzles 22 may be dedicated to each cooking appliance 10, or alternatively, one or more evenly spaced spray nozzles 22 may be used for all of the cooking appliances 10.

The source of fire suppression agent 24 is arranged in fluid communication with the nozzles 22 via an agent delivery path defined by a delivery piping system 26. In the event of a fire, the fire suppression agent is allowed to flow through the delivery piping system 26 to the one or more spray nozzles 22 for release directly onto an adjacent cooking hazard area 14 of the one or more cooking appliances 10.

Those skilled in the art will readily appreciate that the fire suppression agent can be selected from materials such as water, dry chemical agent, wet chemical agent, or the like. Further, the source of fire suppression agent 24 may additionally contain a gas propellant for facilitating the movement of the fire suppression agent through the delivery piping system 26. However, embodiments where the propellant is stored separately from the fire suppression agent are also contemplated herein.

In an embodiment, the fire suppression system 20 is actuated in response to a fire sensing device (illustrated schematically at 28), such as a smoke detector or a heat sensor, for example. In response to heat or smoke exceeding an allowable limit, a control box C will direct a signal to an actuator 30 to open a valve 32 to allow the fire suppression agent to flow from the source 24 to the nozzles 22. For example, in an embodiment the fire sensing device is a heat sensor including an activator bulb. When a fire is present, the increased heat resulting from the flames will cause the activator bulb to break, thereby releasing the tension on the cable connecting the fire sensing device to the control box C. Alternatively, or in addition, the fire suppression system 20 may include a manual activation system 34, also referred to herein as a manual pull station, configured to actuate the control box C to activate the valve 32 to initiate operation of the fire suppression system 20.

With reference now to FIGS. 2-5, exemplary embodiments of an actuation mechanism 40 are illustrated. In an embodiment, the actuation mechanism 40 may be arranged upstream from the control box C within the fire suppression system 20. However, embodiments where the actuation mechanism 40 is arranged at another location within the fire suppression system 20, or embodiments where the actuation mechanism 40 is adapted for use as the control box C are also contemplated herein. As shown, the actuation mechanism 40 includes a plurality of inputs and at least one output. In the illustrated, non-limiting embodiment, the plurality of inputs includes a first input 42*a* and a second input 42*b*, and the at least one output includes a single output 44. However, it should be understood that embodiments having more than two inputs, and two or more outputs are also within the scope of the disclosure.

The first input 42*a* may be associated with a first region of the fire suppression system 20 including a first plurality of spray nozzles 22 and the second input 42*b* may be associated with a second region of the fire suppression system 20 including a second plurality of spray nozzles 22. The first region and the corresponding first spray nozzles are distinct and may be located remotely from the second region and the corresponding second spray nozzles. However, embodiments where the first input 42*a* and the second input 42*b* are operably coupled to the same region of the fire suppression system 20 are also contemplated herein. In such embodiments, the first and second inputs 42*a*, 42*b* can provide redundancy within the fire suppression system 20.

Figure 4:
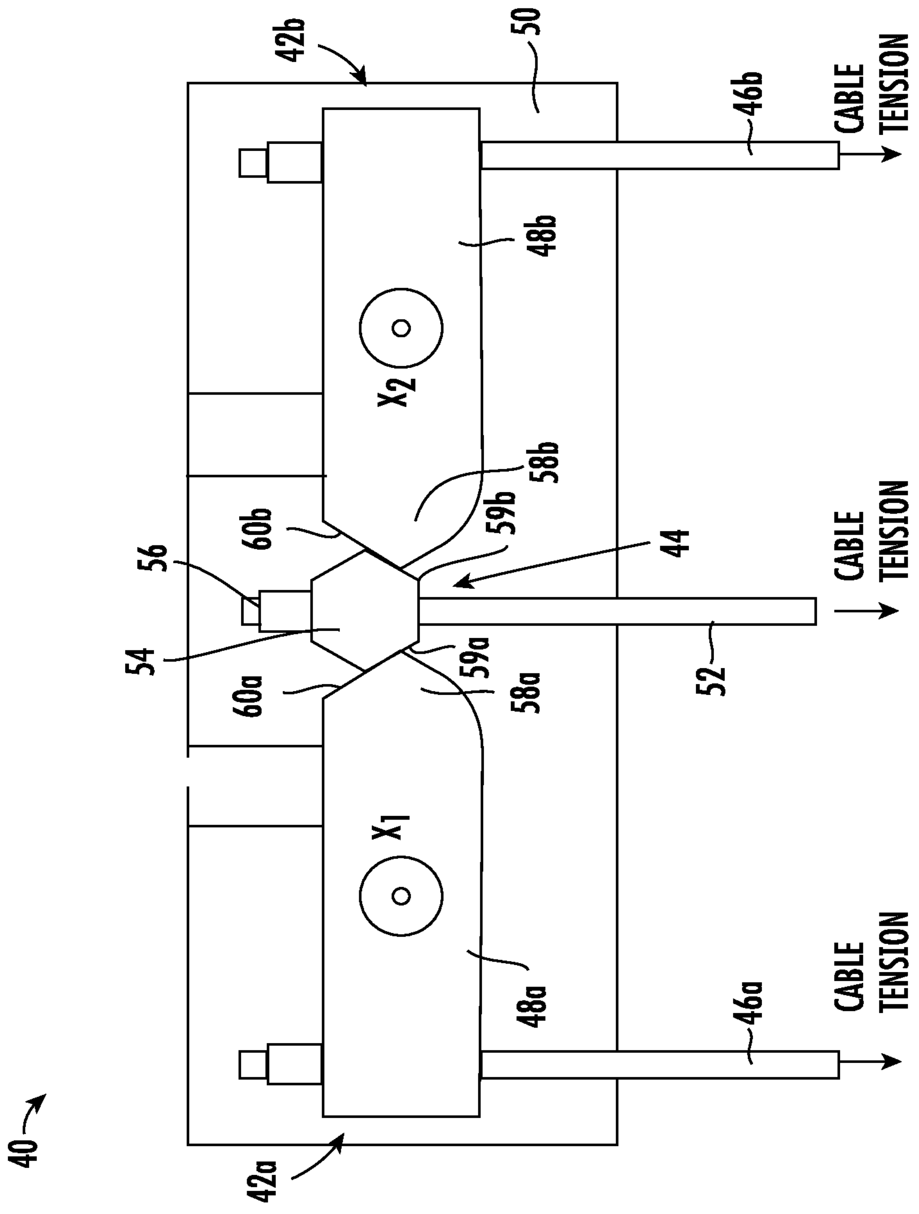
FIG. 4 is a schematic diagram of an exemplary actuation mechanism in an inactive configuration according to an embodiment.
Figure 5:
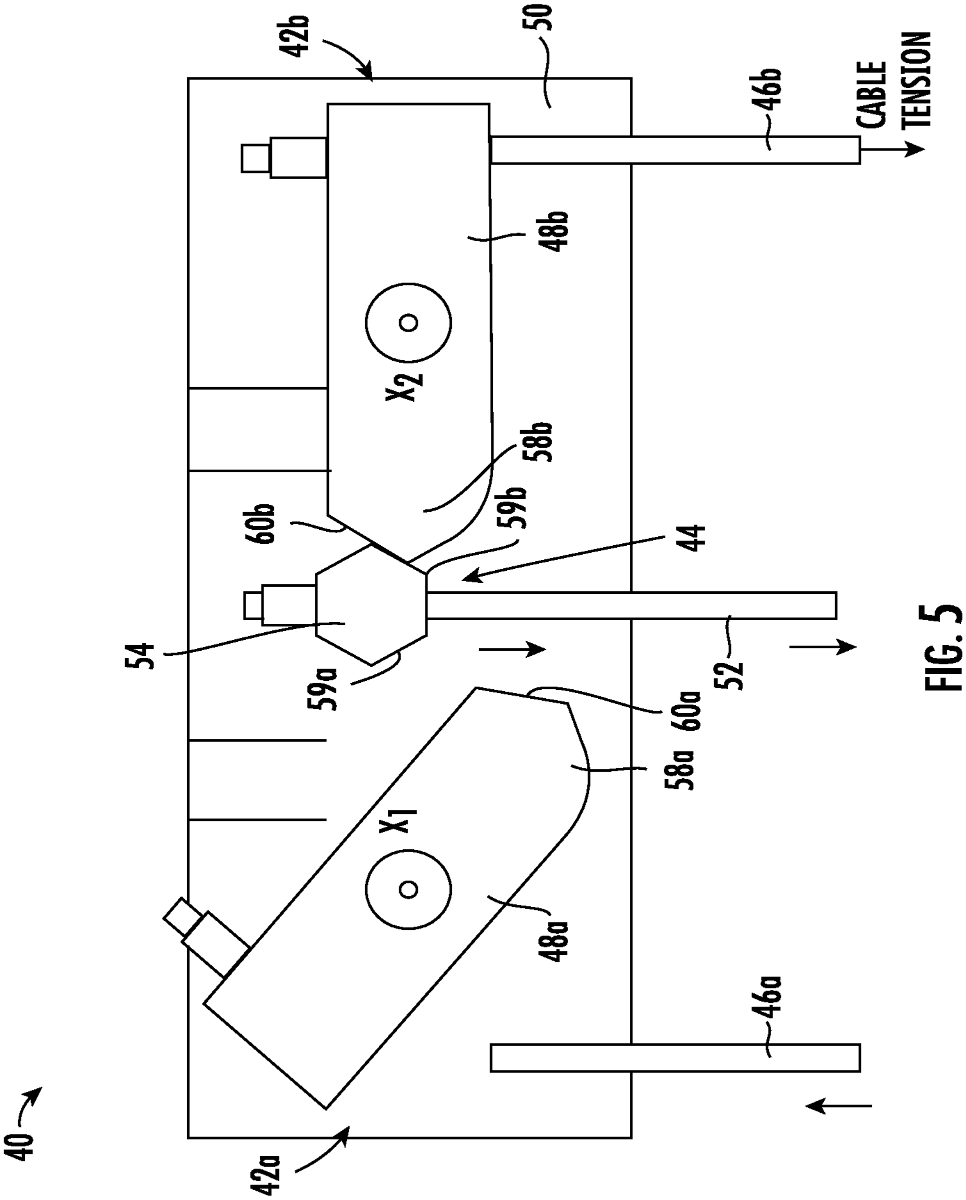
FIG. 5 is a schematic diagram of the actuation mechanism of FIG. 4 in an active configuration according to an embodiment.

Each of the first input 42*a* and the second input 42*b* includes a respective tension member 46*a*, 46*b*, such as a rope or cable for example, and a support 48*a*, 48*b* operably coupled to the tension member 46*a*, 46*b*. Each tension member 46*a*, 46*b* may be coupled to or attached to a support 48*a*, 48*b* in any suitable manner. Although the tension members 46*a*, 46*b* are illustrated as being connected to an interior facing end of the supports 48*a*, 48*b*, respectively, embodiments where the tension members 46*a*, 46*b* are connected near to the supports 48*a*, 48*b* near an outward facing end thereof, as shown in FIGS. 4 and 5 for example, are also contemplated herein. Further, each of the first tension member 46*a* and the second tension member 46*b* may be operably coupled to a detector/sensor or a manual activation system 34. Accordingly, a first tension is typically applied to the first tension member 46*a* and a second tension is typically applied to the second tension member 46*b*.

Figure 6:
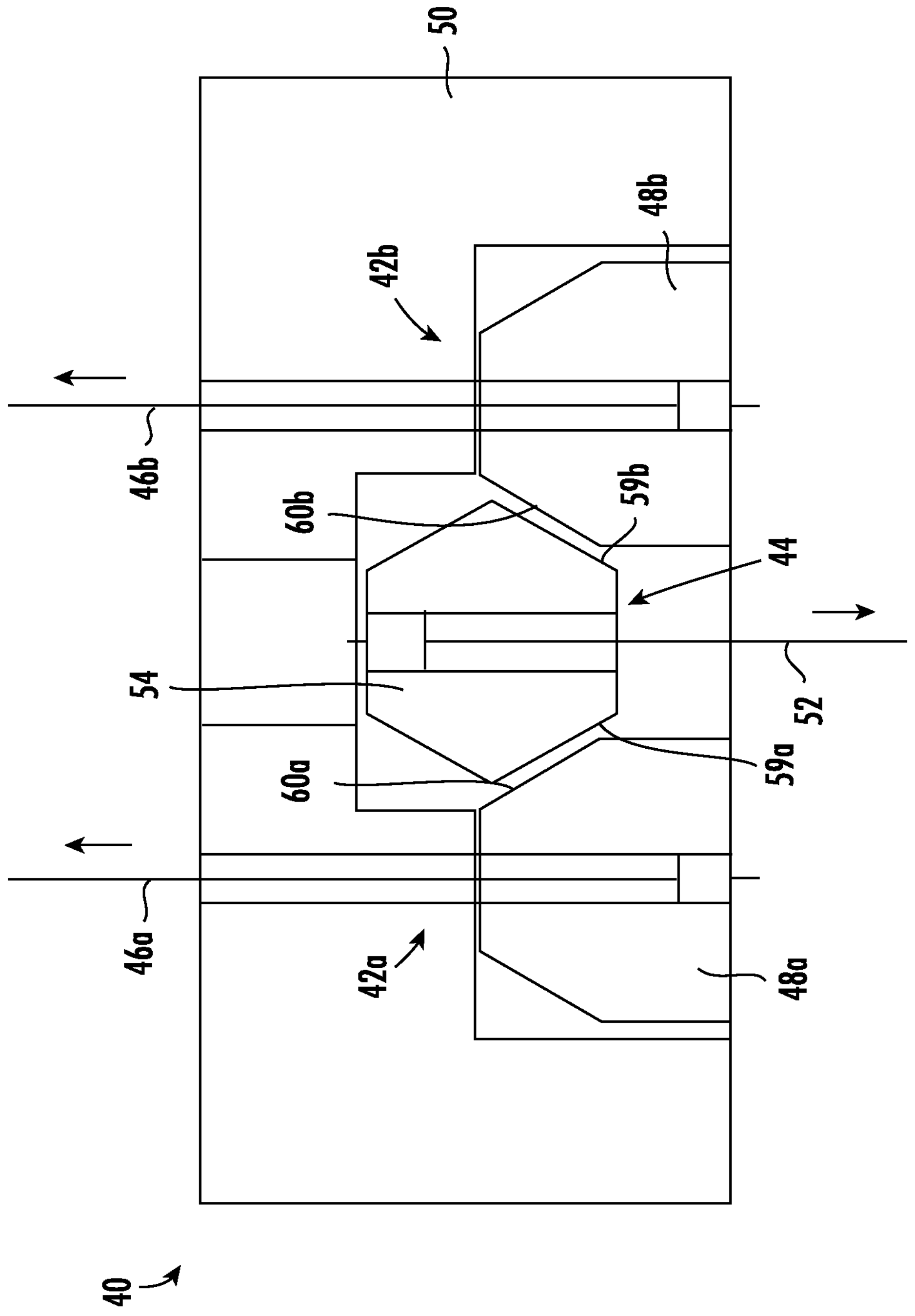
FIG. 6 is a schematic diagram of an exemplary actuation mechanism in an inactive configuration according to an embodiment.
Figure 7:
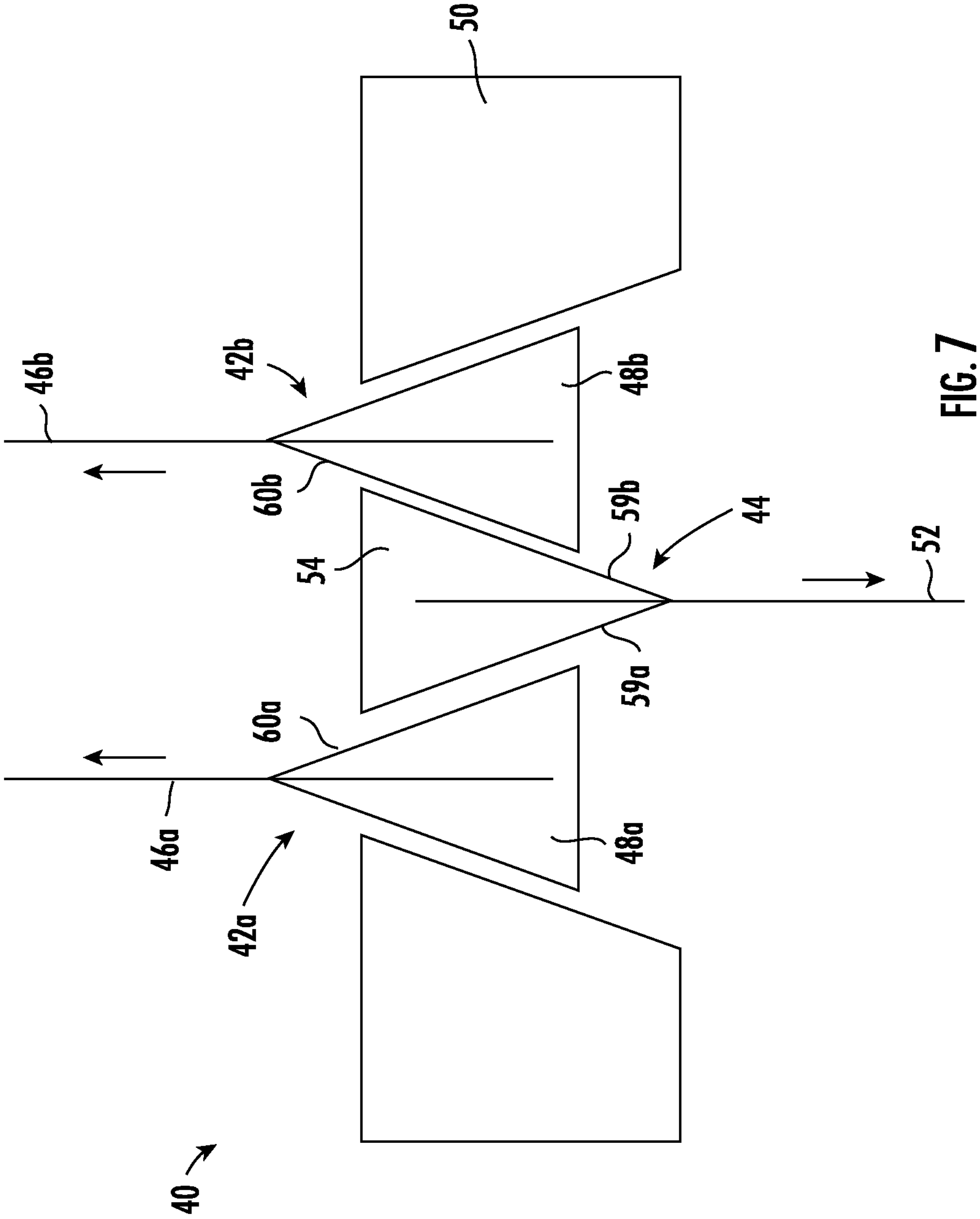
FIG. 7 is a schematic diagram of an exemplary actuation mechanism in an inactive configuration according to an embodiment.
Figure 8:
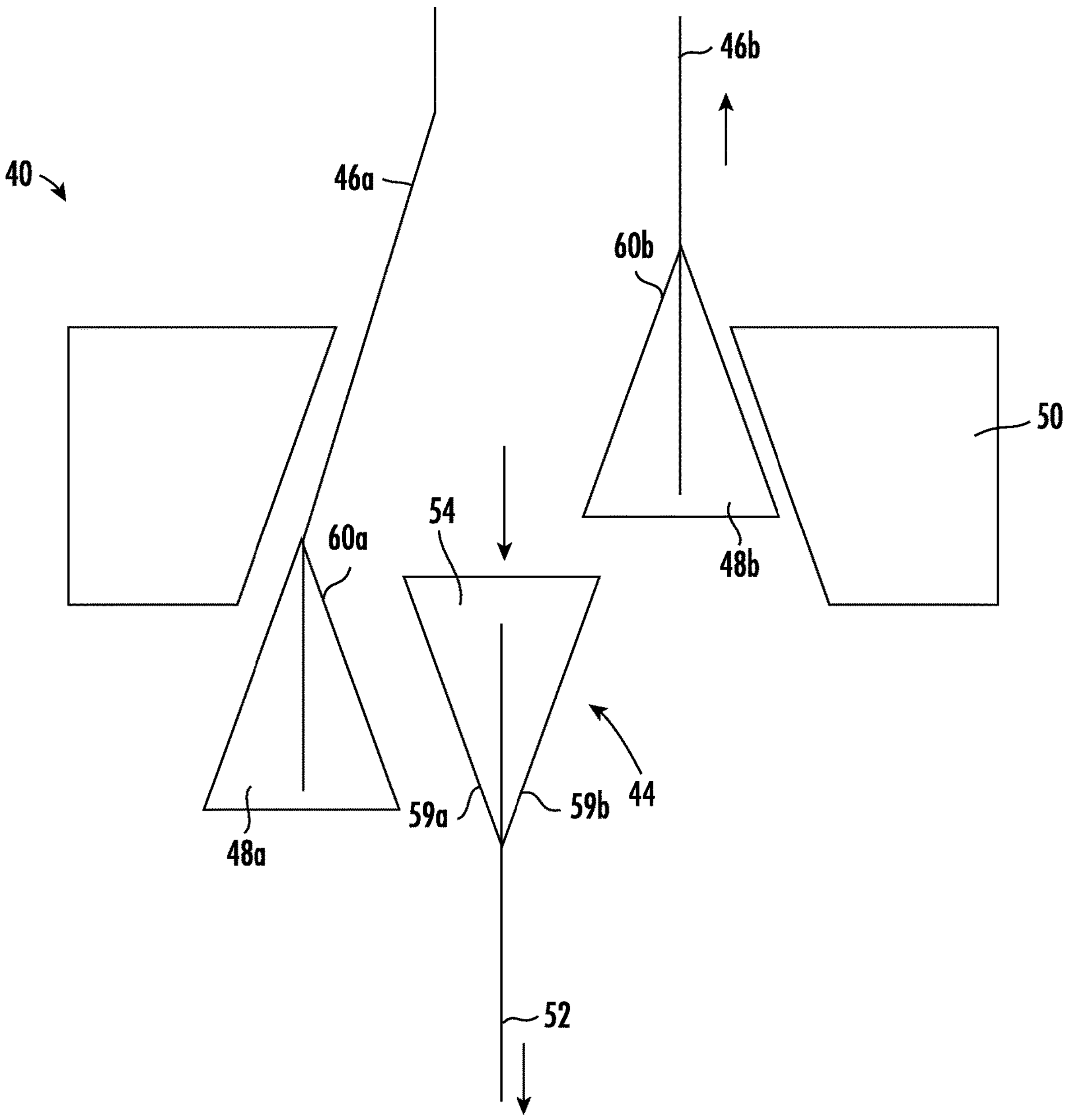
FIG. 8 is a schematic diagram of the actuation mechanism of FIG. 7 in an active configuration according to an embodiment.

The first support 48*a* and the second support 48*b* may be substantially identical in size and shape. However, embodiments where the first and second supports 48*a*, 48*b* have different configurations are also contemplated herein. In the illustrated, non-limiting embodiment of FIGS. 2-5, the first support 48*a* and the second support 48*b* are pivotally mounted to a wall 50. In an embodiment, the wall 50 is a portion of the housing of the actuation mechanism 40. In other embodiments, as shown in FIGS. 6-8, at least one of the first support 48*a* and the second support 48*b* may be translatable relative to the wall 50. Further, in such embodiments, translation of the supports 48*a*, 48*b* in the direction of tension may be restricted. For example, the configuration of the wall 50 may be selected to define an end position along the path of movement of the support members 48*a*, 48*b*.

In an embodiment, tension is applied to each of the tension members 46*a*, 46*b*, of the first and second inputs 42*a*, 42*b* in the same first direction. As shown, the first support 48*a* and the second support 48*b* may be generally mounted in axial alignment. Alternatively, or in addition, the first rotational axis $X_1$ of the first support 48*a* and the second rotational axis $X_2$ of the second support 48*b* may be oriented parallel to one another and coplanar.

The at least one output 44 includes a respective output tension member 52, such as a rope or cable for example, and a retaining member 54 connected to the output tension member 52, such as near at or near a first end 56 thereof. A second end of the output tension member 52 may be operably coupled to a valve, such as valve 32 for example, arranged in fluid communication with one or more canisters 24 of agent operably coupled to a respective region of the fire suppression system 20.

As shown, the first support 48*a* and the second support 48*b* are separated from one another such that a clearance is arranged therebetween. In an embodiment, the clearance is defined between an active end 58*a*, 58*b* of both the first support 48*a* and the second support 48*b*, respectively.

Figure 2:
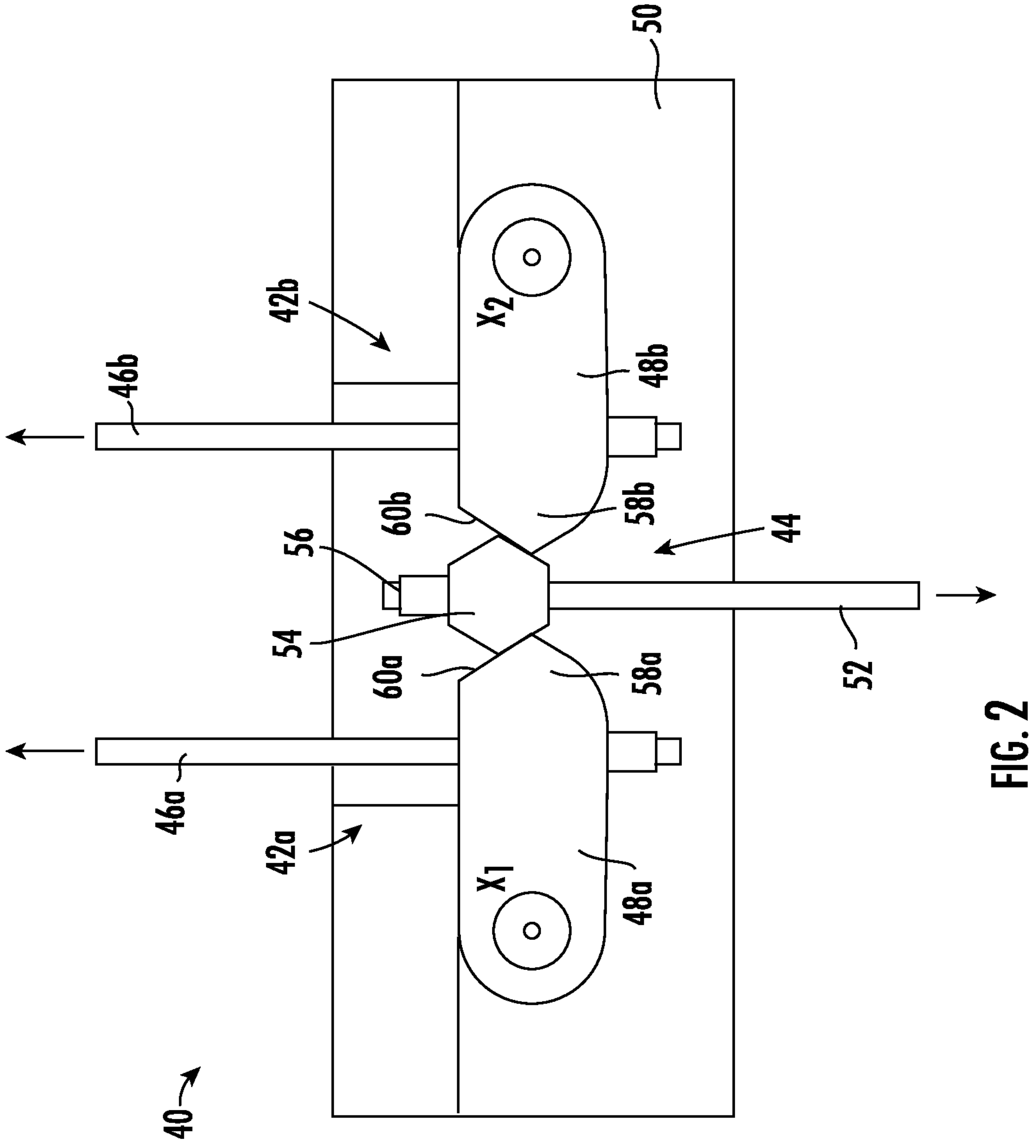
FIG. 2 is a schematic diagram of an exemplary actuation mechanism in an inactive configuration according to an embodiment.

With continued reference to FIGS. 2-5, when the first and second tensions are applied to the first and second tension members 46*a*, 46*b*, respectively, as shown in FIGS. 2 and 4, the plurality of inputs 42*a*, 42*b* cooperate to maintain tension on the output 44 to oppose the gravitational force acting on the output 44. Accordingly, the first input 42*a* and the second input 42*b* cooperate to restrict movement of the output 44 in at least one direction, thereby maintaining the actuation mechanism 40 in an inactive configuration. Although the tensions applied to the tension members 46*a*, 46*b* are illustrated as being in a direction opposite the tension in the output tension member 52 in FIGS. 2 and 3, embodiments where the tensions are acting in the same direction, such as shown in FIGS. 4 and 5, are also contemplated herein. The retaining member 54 of the output 44 is arranged in contact with a portion of both the first support 48*a* and the second support 48*b*. For example, in the inactive configuration, the retaining member 54 is operably coupled and retained in the inactive position by the active ends 58*a*, 58*b* of the plurality of supports 48*a*, 48*b*. However, embodiments where the retaining member 54 is arranged in contact with another portion of one or more of the supports 48*a*, 48*b*, such as a top surface thereof for example, are also within the scope of the disclosure. Accordingly, the clearance defined between the supports 48*a*, 48*b* is greater than the output tension member 52, but is smaller than the retaining member 54.

In the illustrated, non-limiting embodiment, a contour of at least one surface 59*a*, 59*b* of the retaining member 54 is selected to cooperate with and engage a corresponding surface 60*a*, 60*b* of the active end 58*a*, 58*b* of each of the first and second supports 48*a*, 48*b*. As shown, the retaining member 54 has a plurality of angled or sloped sides, and a surface 60*a*, 60*b* of the active ends 58*a*, 58*b* has a corresponding or complementary slope or angle. In the embodiment of FIGS. 2-5, the sloped surface are arranged only at the active end 58*a*, 58*b* of the supports. However, in other embodiments, such as shown in FIG. 6, other surfaces of the supports 48*a*, 48*b* may also have a sloped or angled surface. Although a retaining member 54 having a hexagonal configuration is pictured, it should be understood that a retaining member 54 having any suitable configuration, such as a partially curved retaining member for example is also within the scope of the disclosure. For example, with reference to FIGS. 7-8, each of the supports 48*a* and 48*b* and the retaining member 54 has a similar triangular configuration and the orientation of the retaining member 54 is opposite to the orientation of the supports 48*a*, 48*b*.

Figure 3:
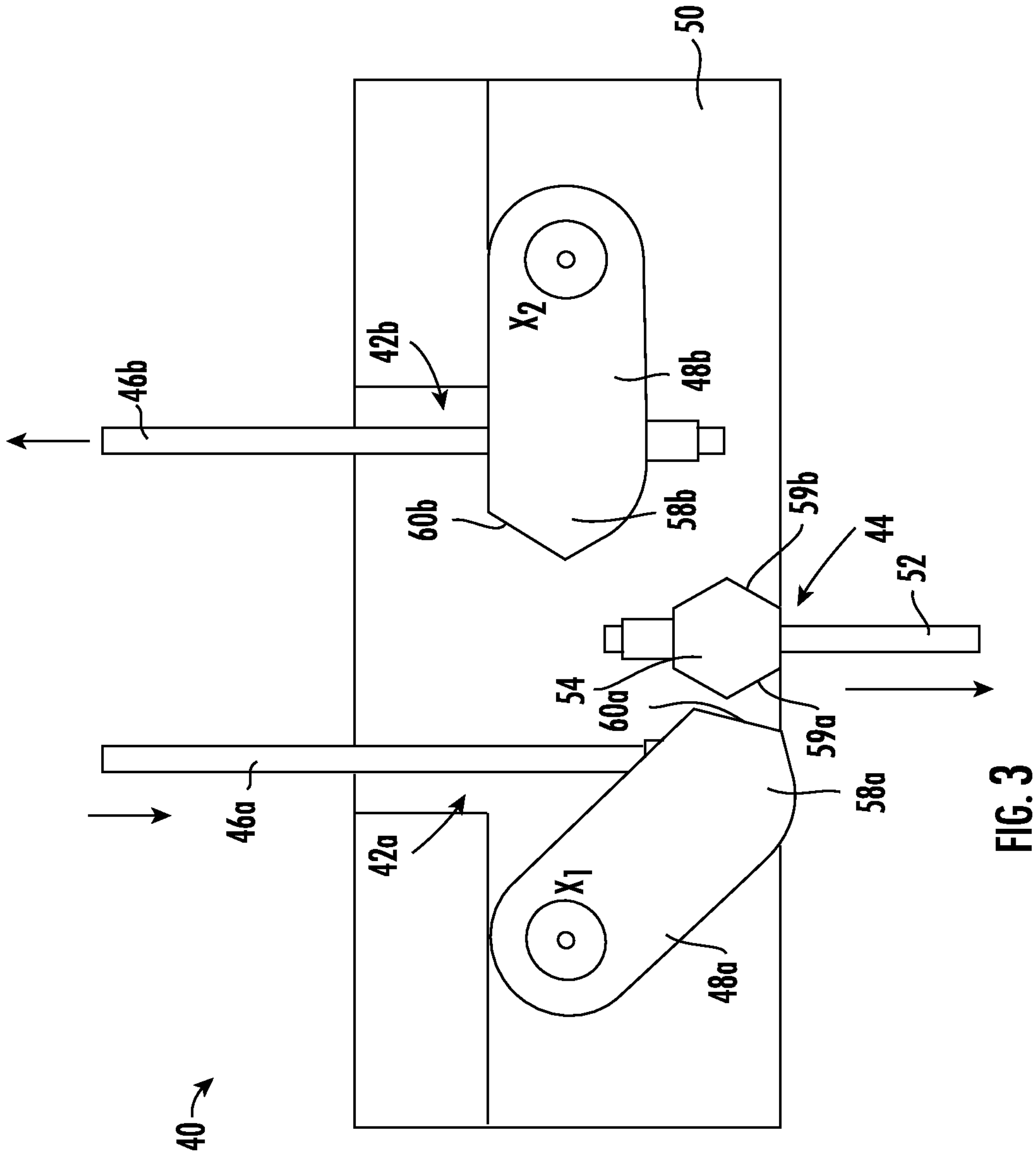
FIG. 3 is a schematic diagram of the actuation mechanism of FIG. 2 in an active configuration according to an embodiment.

The actuation mechanism 40 may be transformable from an inactive configuration to an active configuration in response to a loss of tension of at least one of the plurality of inputs 42*a*, 42*b*. With reference now to FIGS. 3 and 5, the tension acting on the first tension member 46*a* has been removed, or applied in an opposite direction. Such a loss or change in tension may occur in response to detection of smoke of a heat exceeding an allowable threshold, or in response to operation of a manual activation system 34. As a result of this loss or change of tension, the first support 48*a* is no longer operable to cooperate with the second support 48*b* to oppose the force acting on the output tension member 52 and maintain the position of the retaining member 54.

In the illustrated, non-limiting embodiments of FIGS. 2-5, the force acting on the active end 58*a* of the first support 48*a* applied thereto by the retaining member 54 will facilitate rotation of the first support 48*a* about its axis $X_1$, away from the second support 48*b*. In embodiments where tension is still acting on the tension member 46*b* of the second input 42*b*, the second support 48*b* will remain stationary. As the first support 48*a* rotates out of the path of movement of the output 44, the active end 58*a* disengages from the retaining member 54 thereby allowing the retaining member 54 to separate from the active end 58*b* of the second support 48*b*. Although the actuation mechanism 40 is illustrated and described in a vertical configuration where the supports 48*a*, 48*b* cooperate to oppose gravity acting on the retaining member 54, it should be understood that embodiments where the actuation mechanism 40 has another configuration and the supports 48*a*,48*b* cooperate to maintain a tension in the tension member 52 are contemplated herein.

Figure 9:
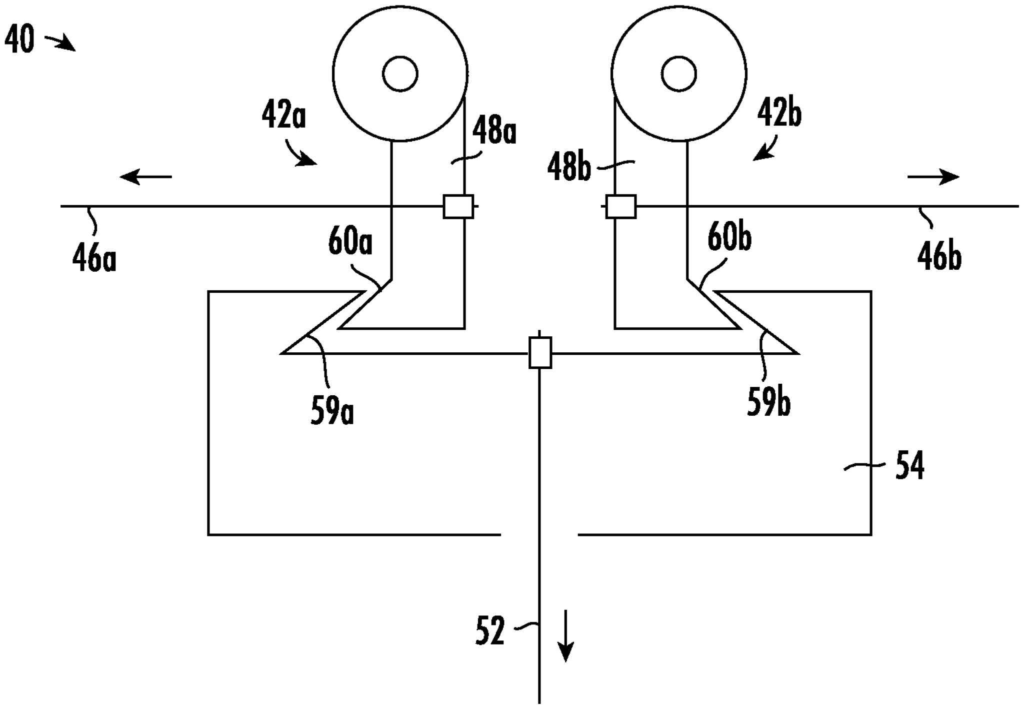
FIG. 9 is a schematic diagram of an exemplary actuation mechanism in an inactive configuration according to an embodiment.

With reference now to FIG. 9 an actuation mechanism 40 according to another embodiment is illustrated. As shown, the retaining member 54 has a groove formed therein, and the active end 58*a*, 58*b* of each of the support members 48*a*, 48*b* is positioned within the groove. In the illustrated, non-limiting embodiment, a configuration of the active ends 58*a*, 58*b* is selected to engage a corresponding surface 59*a*, 59*b* of the retaining member 54 and restrict movement of the retaining member relative to the inputs 42*a*, 42*b*. Similar to the embodiments previously described, in response to a loss of tension acting on the tension member 46*a* of one of the inputs 42*a*, the first support 48*a* will move, for example rotate, out of engagement with the surface 59*a* of the retaining member 54. As a result, the tension acting on the retaining member 54 is sufficient to move the retaining member 54 relative to the second input 42*b*.

Although an actuation mechanism having a single stage of inputs and outputs is illustrated, it should be understood that embodiments having a plurality of stages (i.e. a first stage, a second stage, etc.) arranged in series, such as where the output of a first or upstream stage is operably coupled to the input of a second or downstream stage for example, are also contemplated herein.

The actuation mechanism 40 illustrated and described herein allows a plurality of detection cables to be consolidated at or prior to the control box C. In such embodiments, the control box C would require only a single input mechanism thereby providing a common assembly suitable for all applications. Further, in applications where all downstream items or components of a system are cable operated, an actuation mechanism as described herein may eliminate the need for a control box C all together.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An actuation mechanism of a fire suppression system comprising:

a first input having a first support and a first tension member, the first support being a generally elongated body having a distal end opposite of a proximal end, the first tension member coupled to the proximal end of the first support, wherein a first tension is applied to the first support at the proximal end of the first support in a first direction, wherein the first support is rotatably mounted about a first rotational axis spaced apart from the first tension member and disposed at the distal end of the first support;

a second input having a second support and a second tension member, the second support being a generally elongated body having a distal end opposite of a proximal end, the proximal end of the second support spaced apart from and facing the proximal end of the first support, wherein the second tension member is coupled to the proximal end of the second support, wherein a second tension is applied to the second support at the proximal end of the second support in a second direction, wherein the second support is rotatably mounted about a second rotational axis spaced apart from the second tension member and disposed at the distal end of the second support; and an output including an output tension member and a retaining member connected to the output tension member and disposed between the first support and the second support, the output tension member applying a third tension to the retaining member in a third direction, the third direction opposing the first direction and the second direction;

wherein the actuation mechanism is moveable from an inactive configuration to an active configuration upon a release of one of the first tension and the second tension, wherein in the active configuration the retaining member is positioned between the first support of the first input and the second support of the second input and engages the first support and the second support to maintain the retaining member between the first support and the second support, and wherein in a release of one of the first tension and the second tension, the third tension pulls the retaining member, so as to rotate a corresponding one of the first support and the second support.

2. The actuation mechanism of claim 1, wherein the first support and the second support are disposed on a bottom surface of the retaining member.

3. The actuation mechanism of claim 1, wherein a first rotational axis of the first support is parallel to and coplanar with a second rotational axis of the second support.

4. The actuation mechanism of claim 1, wherein when the actuation mechanism is in the inactive configuration, the retaining member is arranged in contact with a portion of the first support and the second support.

5. The actuation mechanism of claim 4, wherein in the inactive configuration, a clearance is formed between the first support and the second support, wherein the clearance is smaller than the retaining member.

6. The actuation mechanism of claim 4, wherein each of the first support and the second support has an active end and when the actuation mechanism is in the inactive configuration, the retaining member is operably coupled to the active end of at least one of the first support and the second support.

7. The actuation mechanism of claim 6, wherein a surface of the active end of at least one of the first support and the second support is complementary to a corresponding surface of the retaining member.

8. The actuation mechanism of claim 1, wherein the fire suppression system further comprises a plurality of spray nozzles and the first input is associated with a first region of the plurality of spray nozzles and the second input is associated with a second region of the plurality of spray nozzles.

9. The actuation mechanism of claim 1, wherein the fire suppression system further comprises a plurality of spray nozzles and the first input is associated with a first region of the plurality of spray nozzles and the second input is associated with the first region of the plurality of spray nozzles.

10. The actuation mechanism of claim 1, wherein the fire suppression system further comprises a sensor and a manual activation system, wherein the first input is operably coupled to the sensor and the second input is operably coupled to the manual activation system.

11. The actuation mechanism of claim 1, wherein the actuation mechanism includes a plurality of stages including a first stage and a second stage, the first input, the second input, and the output being arranged within the first stage, wherein the output is operably coupled to an input of the second stage.

12. An actuation mechanism of a fire suppression system comprising:

a first input having a first support and a first tension member, the first support having a bottom surface opposite of a top surface and the first tension member is coupled to the bottom surface of the first support, wherein a first tension is applied to the first support via the first tension member in a first direction, wherein the first support is rotatably mounted about a first rotational axis;

a second input having a second support and a second tension member disposed on a bottom surface of the second support, wherein a second tension is applied to the second support via the second tension member in a second direction, wherein the second support is rotatably mounted about a second rotational axis; and an output including an output tension member and a retaining member having a top surface opposite of a bottom surface, the output tension member is connected to the bottom surface of the retaining member and applies a third tension to the retaining member in a third direction, wherein the retaining member is disposed between the first support and the second support, wherein the first direction, the second direction and the third direction are in the same direction;

wherein the actuation mechanism is configured to move from an inactive configuration to an active configuration upon a release of one of the first tension and the second tension, wherein in the inactive configuration the bottom surface of the retaining member abuts against the top surface of the first support and the second support to retain the retaining member between the first support and the second support and in the active configuration one of the first support and the second support is rotated to clear a path for the retaining member to be released.

* * * * *